Aug. 20, 1963   R. D. HUBER   3,101,163
BICYCLE SADDLE BAG CARRIER AND SPOKE PROTECTOR
Filed May 15, 1961
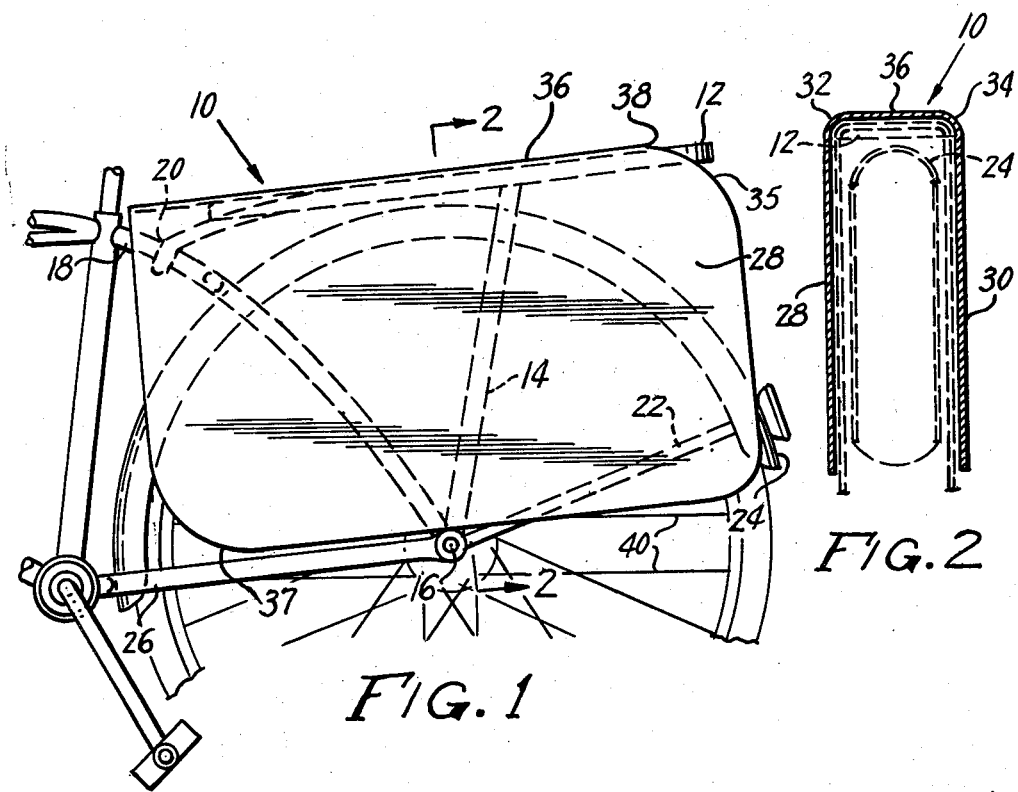
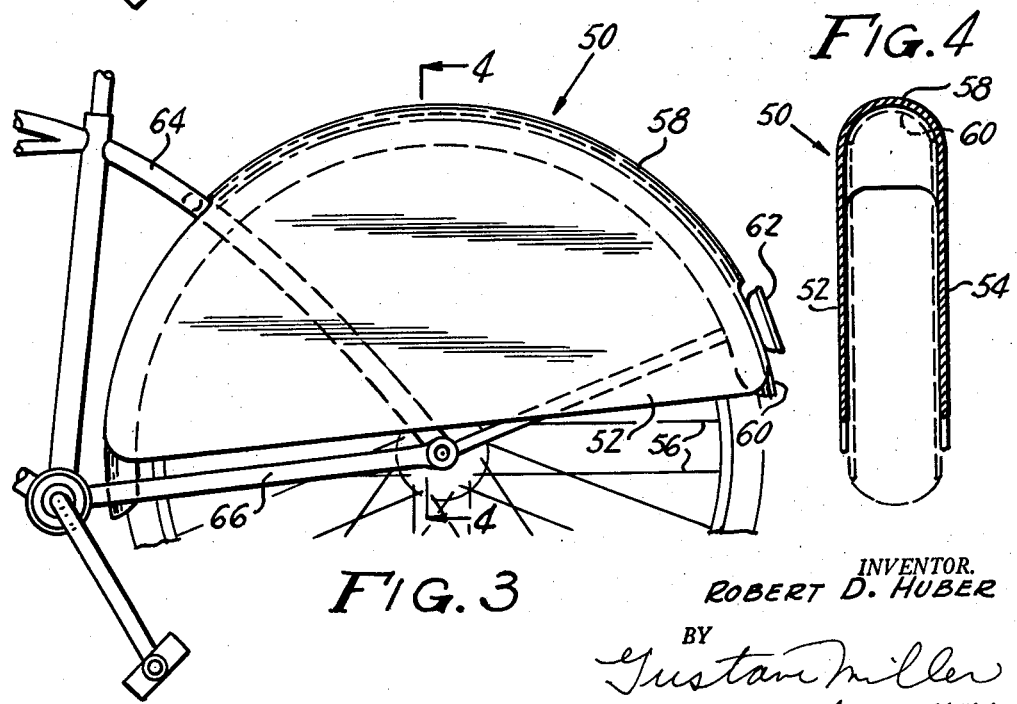
INVENTOR.
ROBERT D. HUBER
BY
Gustave Miller
ATTORNEY.

United States Patent Office 3,101,163
Patented Aug. 20, 1963

3,101,163
BICYCLE SADDLE BAG CARRIER AND
SPOKE PROTECTOR
Robert D. Huber, Lima, Ohio, assignor to
Gustave Miller, Washington, D.C.
Filed May 15, 1961, Ser. No. 109,892
2 Claims. (Cl. 224—32)

This invention relates to a bicycle wheel spoke protector, and has for an object to provide an improved bicycle wheel spoke protector particularly adapted for the rear wheel of a bicycle so that a saddle bag or pair of newspaper bags tied together may be secured over the bicycle rear wheel and rest against the spoke protector so that the bicycle may be used safely without any danger of any part of the saddle bag coming into contact with the bicycle spoke to damage the spoke by being caught in between spokes, with the added probability of causing a spill and injury to the bicycle rider.

Still a further object of this invention is to provide a bicycle spoke protector over which a newspaper carrier bag may be carried in such a manner as to avoid personal injury to the bicycle rider, and to avoid costly replacement of bicycle spokes damaged by the carrier bag.

Still a further object of this invention is to provide a bicycle spoke protector which may be readily and easily placed over a rear wheel of a bicycle and may be made of any suitable material such as wood, masonite, metal, plastics or the like, the use of plastics as they are properly known having the advantage of durability, lightness, low manufacturing cost with resulting low retail cost, the plastic, of course, being of a high-impact type that, in itself, is not liable to breakage.

Still a further object of this invention is to provide a bicycle wheel spoke protector that may conform to the shape of the bicycle mudguard or fender, or, when a flat-topped carrier is provided, may conform in shape to the flat top of the carrier for readily supporting a saddle bag (the term saddle bag including not only the conventional saddle bag, but a pair of bags such as newspaper carrier bags secured together, and thus capable of being supported on a saddle such as provided by the protector of this invention).

With the above and related objects in view, the present invention consists in the details of construction and combination of parts, as will be more fully understood from the following description, when read in conjunction with the accompanying drawings, in which:

FIG. 1 is an elevational view of one form of this bicycle wheel spoke protector as conforming to a conventional flat-topped carrier on a rear bicycle wheel.

FIG. 2 is a sectional view on line 2—2 of FIG. 1.

FIG. 3 is a view similar to FIG. 1, wherein the protector conforms to the shape of the mudguard or fender, with no separate carrier present.

FIG. 4 is a sectional view on line 4—4 of FIG. 3.

There is shown at 10 the form of this invention particularly adapted for use in connection with a carrier 12 having the usual flat top slanting down forwardly, and mounted in a customary conventional manner by brace 14 on a bicycle rear wheel axle 16 and secured to the bicycle fork 18 in a conventional manner, as at 20, such construction being conventional and forming no part, per se, of this invention.

Also mounted on the same axle 16 by means of a similar brace 22 is a mudguard or fender 24, secured in a conventional manner to the fork 18 and also to the lower frame member 26. The legs of the fork 18 and the lower frame members 26 constitute pairs of upper and lower legs of a pair of bicycle V-frame members and the axle 16 extends through their apices.

The bicycle wheel spoke protector 10 in this case consists of a pair of somewhat rectangular sheet metal shields 28 and 30, of rigid construction, and rigidly depending at 32 and 34 from a rigid bridge 36, the bridge 36 conforming in shape to the flat top of the carrier 12, the bridge 36 thus being similarly flat, and slanting down forwardly, complementary to the bicycle carrier 12. Obviously, the bicycle portion forward of the bridge limits the forward placement of the bridge 36 and shields 28. The lower edges of the shields 28 are aligned approximately with the axle 16 and the lower legs 26 of the pairs of bicycle frame V-members. This, therefore, locates the center of gravity of the spoke protector 10 substantially forward of and below the high rear edge of the forwardly down slanting bicycle carrier 12.

The rear end of the bridge 36, as at 38, may be slightly shorter than the length of the bicycle carrier 12, and the rear upper ends of the shields 28 and 30 are arcuately formed as at 35. Similarly, the lower forward ends may be arcuately formed as at 37.

As a result of such shape and construction, it will be noted that no fastening or securing means is used to hold the protector 10 on the carrier 12—it will usually remain in position of its own weight. Should it shift position while in use, it can only slide down forwardly until it abuts the portion of the bicycle in its path, either the top of the rear fork or the seat post.

In use, the saddle bags, or a pair of newspaper carrier bags tied together, have their joining portions placed over the bridge or saddle portion 36, with the bags resting against the sides of the shields 28 and 30 and thus kept out of contact with the spokes 40 of the rear bicycle wheel.

As thus carried out of contact with the bicycle wheel spokes, the bags may be carried safely without danger of catching in or damaging any of the spokes 40, causing the spokes to break and causing a spill, with possible injury to the bicycle rider.

In FIGS. 3 and 4, a modified form of this invention is shown at 50, intended for cooperation with a bicycle in which no carrier is present. In this case, the bicycle shields 52 and 54 are shaped somewhat like half circles, so as to conform in shape to the opposite sides of the rear bicycle wheel 55, but kept spaced from its spokes 56 by a rigid bridge or saddle member 58, the saddle member or bridge 58 conforming in shape to the fender or mudguard 60, the bridge 58 being cut away so as not to interfere with the bicycle rear reflector or light 62, which may be supported at the end of the mudguard or fender 60.

The bridge 58 continues forwardly arcing up and down over the bicycle wheel complementary to the mudguard 60 as far as the bicycle frame member or rear fork 64, and from here on forward the bridge member 58 is absent, but the shields 52 and 54 follow and conform to the shape of the bicycle wheel down almost to the bicycle lower fork member 66, extending in a curve from substantially the rear end of the mudguard to adjacent the forward end of the mudguard. A straight bottom edge connects the rear and forward lower curved ends of the shields. The rigid unitary device thus provided has its center of gravity substantially below the high point of the curvature of the mudguard. The legs of the upper and lower fork members 64 and 66 constitute pairs of upper and lower legs of a pair of bicycle V-frame members, and the rear wheel axle extends through their apices.

In operation, this form also does not necessitate any securing means to the bicycle, it merely rests on the mudguard or fender 60, and due to its conforming shape thereto, curving downwardly from the uppermost point between the fork 64 and the rear light or reflector 62, it is even less likely to need means of securing it to the bicycle.

In operation, this form 50 of the bicycle wheel spoke protector is used in the same manner as the form first described, the saddle bag, or pair of bags tied together merely having their securing means extending over the bridge 58, and the bags rest against the shields 52 and 54 and are prevented from making contact with the wheel spokes 56, and are thus prevented from breaking any spokes or causing spill or injury to the bicycle rider.

Obviously, any suitable rigid material may be used for either form of this invention, and while the shields and the bridge have been shown as being formed integrally together, it is within the scope of this invention that these parts may be formed separately, and then joined rigidly together in any suitable manner.

Although this invention has been described in considerable detail, such description is intended as being illustrative rather than limiting, since the invention may be variously embodied, and the scope of the invention is to be determined as claimed.

Having thus set forth and described the nature of this invention, what is claimed is:

1. For use in self-securing readily detachable combination with a bicycle rear wheel supported on an axle through the apices of a pair of forwardly extending bicycle V-frame members and a mudguard secured at its forward portion to and between both pairs of legs of said pair of forwardly extending V-frame members, said mudguard extending in a rearward curve upwardly and then downwardly over the wheel from said V-frame members; a saddle bag carrier and rear bicycle wheel spoke protector comprising a pair of parallel depending rigid sheet member shields and a rigid bridge member rigidly connected to the upper edges of said shields thereby providing a rigid unitary device, said bridge being complementary to the top of the mudguard from the upper leg of each V-frame member to a point at least adjacent to the rear end of said mudguard, the upper edges of said rigid parallel shields extending in a curve from substantially the rear end of said mudguard to adjacent to the forward end of said mudguard, both ends of said curve being connected by a substantially straight bottom edge, said bridge being arranged to be attachably and detachably supported by said mudguard with the center of gravity of said spoke protector substantially below the high point of the curvature of said mudguard edge to thereby maintain said protector on said mudguard free of any securement means, whereby a saddle bag or the like may be supported on said bridge and rest against said shields free from spoke contact.

2. For use in self-securing readily detachable combination with a bicycle rear wheel supported on an axle through the apices of a pair of forwardly extending bicycle V-frame members and a bicycle carrier slanting down forwardly and secured on a support mounted on said axle and on an upper forwardly extending portion of said bicycle V-frame members; a saddle bag carrier and rear wheel spoke protector comprising a pair of parallel depending rigid sheet member shields and a bridge member rigidly and integrally connected to the upper edges of said shields thereby providing a unitary device, said bridge being arranged to be supported over the rear bicycle wheel with said shields closely adjacent the upper legs of said bicycle V-frame members on opposite sides of the rear wheel, said bridge being complementary to the top of said bicycle carrier and slanting down forwardly toward a portion of the bicycle frame, said shields extending downwardly from said bridge and having their lower edges approximately aligned with said axle and the lower legs of said pair of V-frame members, the center of gravity of said bag carrier and spoke protector being substantially forward of and below the rear high edge of said bicycle carrier to thereby maintain said bag carrier and spoke protector on said bicycle carrier free of any securement means, the forwardly slanted bicycle carrier thereby providing the sole support for maintaining the said forwardly slanted bag carrier and spoke protector thereon, whereby a saddle bag or the like may be supported on said bridge and rest against said shields free from any spoke contact.

References Cited in the file of this patent

UNITED STATES PATENTS

| | | |
|---|---|---|
| 1,027,806 | Blake | May 28, 1912 |
| 2,491,062 | Shephard | Dec. 13, 1949 |
| 2,578,243 | Hampton | Dec. 11, 1951 |
| 2,771,305 | Buegeleisen | Nov. 20, 1956 |

FOREIGN PATENTS

| | | |
|---|---|---|
| 183,595 | Great Britain | July 28, 1922 |